Sept. 29, 1953         J. LÉAUTÉ ET AL         2,653,873
LIGHT-SENSITIVE PHOTOGRAPHIC ELEMENT
Filed June 10, 1952
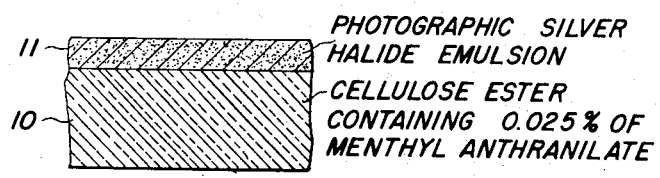
JEAN LEAUTE
PIERRE L. VANDAMME
INVENTORS
BY
ATTORNEY & AGENT Patented Sept. 29, 1953

2,653,873

UNITED STATES PATENT OFFICE 2,653,873

LIGHT-SENSITIVE PHOTOGRAPHIC ELEMENT

Jean Léauté, Vincennes, and Pierre L. Vandamme, Le Perreux sur Marne, France, assignors to Eastman Kodak Company, Rochester, N. Y., a corporation of New Jersey Application June 10, 1952, Serial No. 292,606
In France August 17, 1951

10 Claims. (Cl. 95—9)

This invention relates to photographic elements and a method for identifying them.

Motion picture film is ordinarily identified according to the manufacturer and type (e. g. cellulose acetate or cellulose nitrate) by exposing letters or symbols photographically along the margins of the raw or unprocessed film. Upon development, these markings become visible and permit identification of the film.

The difficulty with such a means of identification is that each foot of film must be separately inspected, which is a somewhat laborious process. Identification is made even more difficult when separate lots of film are spliced together and different types of film are made into a single strip. Rapid identification of film is quite important in recovery of scrap film or in the vault storage of film where cellulose acetate type must be distinguished from cellulose nitrate type film.

It is, therefore, an object of our invention to provide a new photographic element. A further object is to provide a method for distinguishing one film type from another quickly and accurately. Still another object is to provide a new composition of matter. Other objects will become apparent from a consideration of the following description and examples.

According to our invention, we provide new photographic elements having a cellulose ester support containing from 0.005 to 0.5 per cent by weight, based on the cellulose ester, of menthyl anthranilate. On inspection of the photographic element under ultra-violet radiation, a purplish fluorescence of sufficient intensity for identification purposes is exhibited. The fluorescence is more marked, the amount of menthyl anthranilate remaining the same, for a film support of cellulose acetate than for a film support of nitrocellulose.

It is known that fluorescent materials can be added to the film base of photographic elements. For example, Michaelis U. S. Patent 2,331,492, dated October 12, 1943 describes a photographic element containing a fluorescent material, such as rhodamine, in the film base. The purpose of the fluorescent layer of Michaelis is to provide a source of radiant energy to cause exposure of a light-sensitive emulsion, which is not sensitive to primary radiation. Other patents show the use of fluorescent materials in the film base of a photographic element for the purpose of image intensification. We have now found that by using very small amounts of menthyl anthranilate in the film base of a photographic element, the fluorescent properties of the menthyl anthranilate have no substantial effect on the light-sensitive emulsion layer, but are sufficient to permit identification of the photographic element upon inspection under ultraviolet radiation. It was most unexpected to find that over a certain range menthyl anthranilate could be advantageously used without having a deleterious effect on the photographic emulsion. Menthyl anthranilate has no detectable effect on the color of the film base and is insoluble in water or the solutions used in film processing, when used in accordance with the process of our invention.

Whereas the use of fluorescent materials in inks and the like for identifying certain materials has long been known, many of these materials are unsuited for use in connection with the identification of photographic elements because of their adverse effect on the color of the film base or their fogging action on the light-sensitive emulsion coated on the base. These and other difficulties are avoided when menthyl anthranilate is used as the fluorescent material in photographic elements in accordance with our invention.

In the copending application Serial No. 191,017, filed on October 19, 1950, of Ralph H. Talbot, a method for identifying photographic elements comprising adding small amounts of anthracene to the film base, e. g. cellulose acetate, is described. While the method of that application offers certain advantages over the prior art, we have found that the menthyl anthranilate of our invention offers further advantages in that the menthyl anthranilate is more stable than the anthracene.

Menthyl anthranilate is a known compound and has been described in Carpenter U. S. Patent 2,170,185, issued August 22, 1939. It has the following formula:

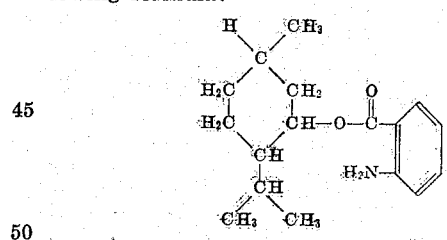

It is also known as Anti-Solaire, L. G.

The accompanying drawing shows a film base of a cellulose ester containing menthyl anthranilate and a coating of a photographic silver halide emulsion on the film base. A further description of the photographic elements of our invention is given below.

The amount of menthyl anthranilate used in our invention is of material importance in determining the properties of the cellulose ester film base, and consequently, the photographic element comprising the cellulose ester film base. An amount less than 0.005 per cent should not be used, nor should an amount in excess of 0.5 per cent be used, the amounts being based on the cellulose ester, since the advantageous results of our invention are not obtained outside of this range. As noted above, for a given amount of menthyl anthranilate, the fluorescence of a cellulose acetate support is more marked than for a cellulose nitrate support. Advantageously, then, a more limited range of menthyl anthranilate in cellulose acetate is from 0.005 to 0.250 per cent by weight. For cellulose nitrate, a more limited range of the menthyl anthranilate is advantageously from 0.250 to 0.5 per cent by weight. The broader range of 0.005 to 0.5 is generally sufficient according to our invention, however.

The menthyl anthranilate can advantageously be added to a viscous solution of "dope" of the cellulose ester, and the composition agitated until homogeneity is accomplished. The menthyl anthranilate can be added in solid form, or in the form of a solution, which contains, for example, the same solvent present in the cellulose ester dope. After intimate mixing the solution is cast into a sheet and the solvent removed by evaporation. A film of the cellulose ester can be first formed and a coating of menthyl anthranilate applied to the cellulose ester layer, although we have found that a product is obtained which does not exhibit the homogeneity and abrasion resistance shown by the product obtained from a cellulose ester dope containing the menthyl anthranilate. A film of cellulose ester can also be immersed in a solution of the menthyl anthranilate in a solvent having no dissolving power for the cellulose ester. Such modes of procedure are not generally to be preferred since the amount of menthyl anthranilate used cannot be as systematically controlled and the menthyl anthranilate is easily removed from the film base during handling.

Cellulose esters which can advantageously be used in our invention comprise cellulose acetate, cellulose propionate, cellulose butyrate, etc., mixed cellulose esters, such as cellulose acetate butyrate, etc., and cellulose nitrate. Our invention is particularly adaptable to the use of cellulose acetate containing, for example, from 35 to 44.8 per cent acetyl. The particular solvent, or mixture of solvents, used in the cellulose ester dope will depend on the acyl content of the ester. For example, cellulose acetate containing from about 39 to 41 per cent acetyl can be dissolved in acetone.

Cellulose acetate containing from about 42.5 to 44.0 per cent acetyl has been found to be especially useful in preparing the photographic elements of our invention. A range of acetyl from 43.0 to 43.5 per cent gives particularly useful results. The menthyl anthranilate can readily be incorporated into such esters by addition to a solution of the ester in a solvent mixture composed of 55 to 85 per cent by weight of methylene chloride, 15 to 5 per cent by weight of methanol or ethanol, and 20 to 0 per cent by weight of ethylene chloride. By replacing the ethylene chloride with propylene chloride, the methylene chloride can comprise from 65 to 90 per cent by weight of the solvent mixture. Cellulose acetate containing from 42.5 to 44.0 per cent by weight, and more particularly from 43.0 to 43.5 per cent by weight, of acetyl provides a film base possessing unusual resistance to tear and separation when subjected to stress or strain. (See, for example, Fordyce et al. U. S. Patents 2,492,977 and 2,492,978, dated January 3, 1950).

The accompanying drawing illustrates, schematically, a cross sectional view of a photographic element representative of those of our invention. The element comprises a support 10 of a cellulose ester, e. g. cellulose acetate of 43 per cent acetyl content containing less than 0.5 per cent (e. g. 0.025 per cent) of menthyl anthranilate and having thereon a photographic silver-halide emulsion 11. Instead of a single photographic silver-halide emulsion, the support 10 can be coated with a plurality of emulsions, for example, as shown in U. S. Patents 2,350,764, dated June 6, 1944; 2,360,214, dated October 10, 1944; 2,376,202, dated May 15, 1945; 2,391,198, dated December 18, 1945; 2,403,721, dated July 9, 1946; etc. The photographic emulsion layer 11, and those described in the above U. S. patents are the usual gelatino-silver halide emulsions customarily used in the art of black-and-white or multi-color reproduction. These emulsions can also consist of silver halide dispersed in other water-permeable colloidal materials, such as synthetic resins, e. g. polyvinyl alcohol, etc., cellulose ethers and esters, etc. Typical silver-halide emulsions include silver chloride, bromide, bromiodide, and chlorobromide types. The photographic silver-halide emulsions can contain the usual addenda, such as polymethine sensitizing dyes, anti-foggants, etc.

What we claim as our invention and desire secured by Letters Patent of the United States is:

1. A photographic element comprising at least one photographic silver halide emulsion layer and a cellulose ester layer containing from 0.005 to 0.5 per cent by weight, based on the cellulose ester, of menthyl anthranilate.

2. A photographic element comprising at least one photographic silver halide emulsion layer and a cellulose acetate layer containing from 0.005 to 0.5 per cent by weight, based on the cellulose acetate, of menthyl anthranilate.

3. A photographic element comprising at least one photographic silver bromide emulsion layer and a cellulose ester layer containing from 0.005 to 0.5 per cent by weight, based on the cellulose ester, of menthyl anthranilate.

4. A photographic element comprising at least one photographic silver chloride emulsion layer and a cellulose ester layer containing from 0.005 to 0.5 per cent by weight, based on the cellulose ester, of menthyl anthranilate.

5. A photographic element comprising at least one photographic silver bromiodide emulsion layer and a cellulose ester layer containing from 0.005 to 0.5 per cent by weight, based on the cellulose ester, of menthyl anthranilate.

6. A photographic element comprising at least one photographic silver chlorobromide emulsion layer and a cellulose ester layer containing from 0.005 to 0.5 per cent by weight, based on the cellulose ester, of menthyl anthranilate.

7. A photographic element comprising at least one photographic silver bromide emulsion layer and a cellulose acetate layer containing from 0.005 to 0.5 per cent by weight, based on the cellulose acetate, of menthyl anthranilate.

8. A photographic element comprising at least one photographic silver chloride emulsion layer and a cellulose acetate layer containing from 0.005 to 0.5 per cent by weight, based on the cellulose acetate, of menthyl anthranilate.

9. A photographic element comprising at least one photographic silver bromiodide emulsion layer and a cellulose acetate layer containing from 0.005 to 0.5 per cent by weight, based on the cellulose acetate, of menthyl anthranilate.

10. A photographic element comprising at least one photographic silver chlorobromide emulsion layer and a cellulose acetate layer containing from 0.005 to 0.5 per cent by weight, based on the cellulose acetate, of menthyl anthranilate.

JEAN LÉAUTÉ.
PIERRE L. VANDAMME.

No references cited.